United States Patent Office

PTO - BOYERS, PA Duty Station

MISSING PAGE TEMPORARY NOTICE

PATENT # 7026 X FOR ISSUE DATE 4-27-1832

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

Data Conversion Operation

Boyers, Pa 7,026X

UNITED STATES PATENT OFFICE.

JOBE B. NORTON, OF UTICA, NEW YORK.

SELF-SHARPENING PLOW.

Specification forming part of Letters Patent dated April 27, 1832.

*To all whom it may concern:*

Be it known that I, JOBE B. NORTON, of the city of Utica, in the county of Oneida and State of New York, have invented a new and useful Improvement in the Construction of the Self-Sharpening Plow; and I do hereby declare that the following is a full and exact description of the construction and operation of the said machine as invented or improved by me.

The improvement consists of a recess sunk on the back side of the mold-board and a projection on the flange sufficient to fill the recess, and of sufficient width to prevent the flange from tipping or changing its position on the mold-board, and in order to prevent the flange from shifting when molding from the pattern.

JOBE B. NORTON.

Witnesses:

THOMAS T. ROWE,
LUCIUS RUNWILL.